Figure 9:
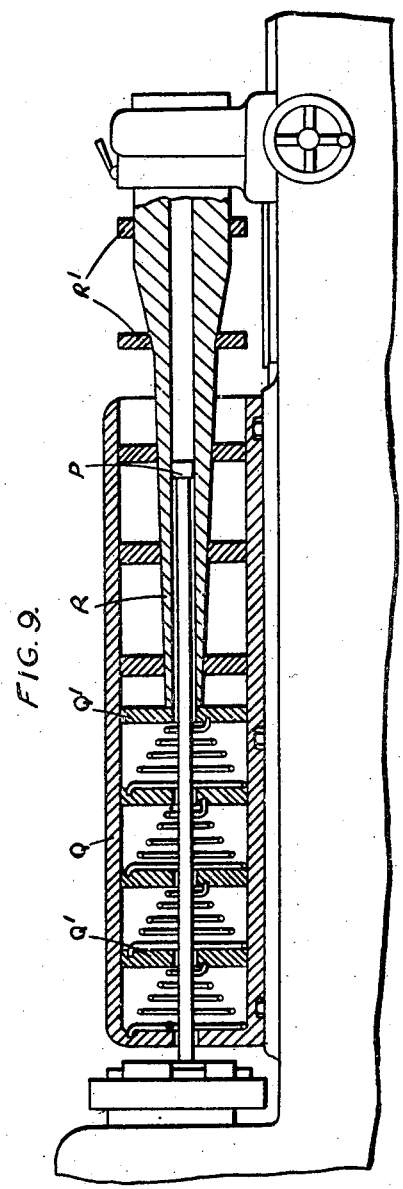

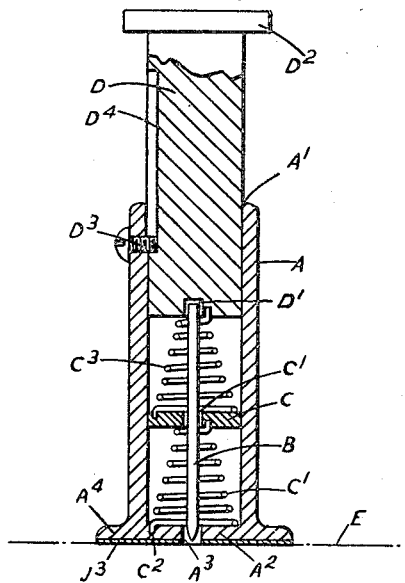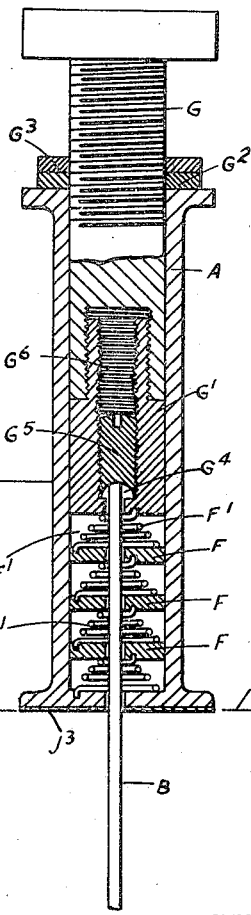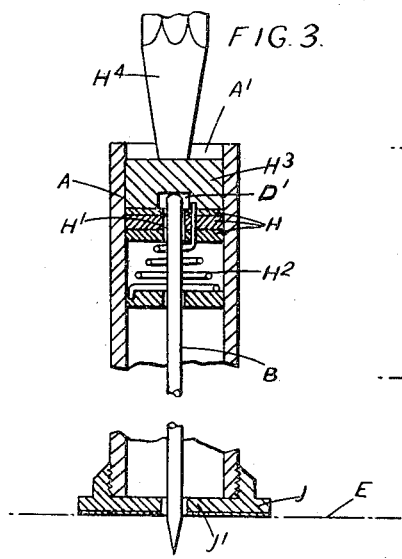

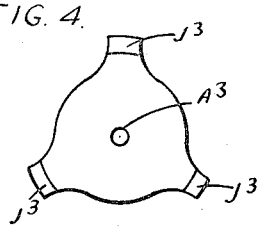
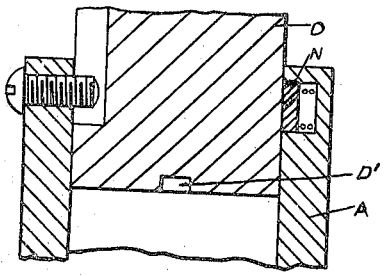
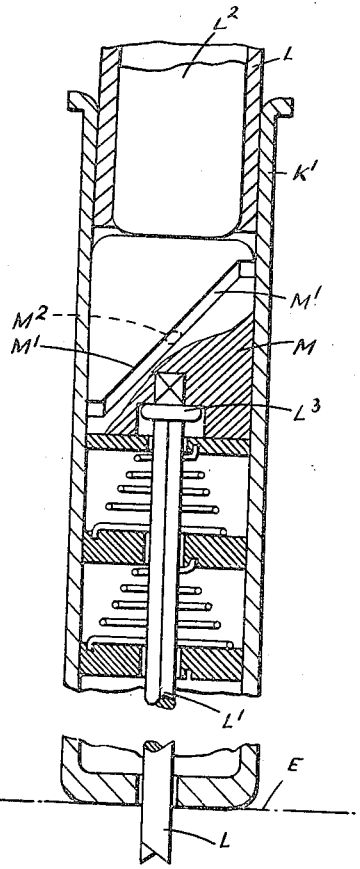
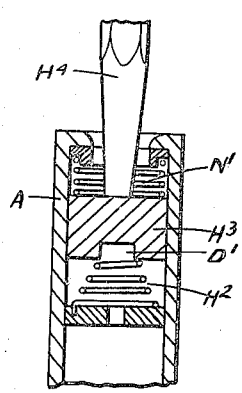
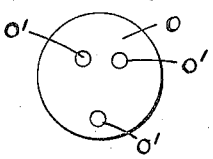

Patented Nov. 15, 1949

2,488,279

UNITED STATES PATENT OFFICE 2,488,279

DEVICE FOR LATERALLY SUPPORTING ELONGATED MEMBERS WHILE UNDER LONGITUDINAL COMPRESSIVE STRESS

James Christopher Fitzmaurice, London, and William Fawcett Shelford Bidwell, Morden, England Application September 27, 1946, Serial No. 699,880 In Great Britain March 20, 1945

Section 1, Public Law 690, August 8, 1946 Patent expires March 20, 1965

12 Claims. (Cl. 1—47)

This invention relates to devices for laterally supporting elongated members while under longitudinal compressive stress, that is to say for affording lateral support against undue bending or flexing when the member is subjected to compressive stress in the direction of its length either percussive or by pressure applied continuously or intermittently.

In practice, numerous examples are available of thrust members, such for example as reciprocating connecting rods, and percussive and reciprocating drills, picks and punches, which are subjected to intermittent compressive stresses accompanied by risk of bending or flexing in the unsupported length of the member. When a rotary penetrating member is, at the same time, rotated about its longitudinal axis, any bending or flexing of the unsupported length of the drill will tend to result in the production of a hole which is not only irregular in cross-section but oversize or conical. In most instances all risk of fracture, inefficient operation and permanent distortion could be avoided by preventing the initiation of bending or flexing since, as soon as the member is even slightly deflected from the straight, whether the elastic limit is thereby exceeded or not, the resistance to further flexure or bending immediately falls to a low value. Moreover, if the member is at the same time rotating about its longitudinal axis, the lateral unbalance due to bending or flexure tends to render this more pronounced. An extreme example of the rapid collapse attendant upon initial deflection from the straight is afforded by the ordinary nail when driven into a hard substance such as hard wood, concrete, masonry or brickwork. If great care is not exercised as to the accuracy and intensity of the hammer blows a bend is initiated after which it is impossible to effect any further penetration.

The invention has for its object to provide an improved supporting device whereby the initiation of bending or flexure of any member while being subjected to a longitudinal compressive stress can be prevented, and which will afford lateral support for the otherwise unsupported length of the member throughout the range of longitudinal travel of the member when this is longitudinally movable.

A lateral supporting device according to the invention comprises a tubular guide or barrel having a fixed or movable apertured end wall or internal stop, at least one floating apertured supporting plate or washer extending transversely across the interior of the barrel, and compression springs which act between one side of the washer and the apertured stop, and between the other side of the washer and a part through which the compressive stress is applied to the elongated member when this extends through the apertures in the stop and washer. Thus, the length of the member lying within the barrel is intermediately reinforced by the lateral floating plate or washer and, if the member moves longitudinally within the barrel, the washer will move simultaneously and in proportion, the springs being compressed and the lateral support thus maintained throughout the length of travel of the member.

Though a single floating washer may be employed when the otherwise unsupported length or shank of the member is not extensive, it is preferred to provide two or more apertured lateral supporting plates or washers axially spaced apart within the barrel by compression springs. Whether one or a plurality of laterally supporting plates or washers is employed, the washer or washers and the compression springs are conveniently detachable from the tubular guide or barrel so that these elements can be added or removed to suit the length of the elongated member lying within the barrel when the springs are fully relaxed.

Though the invention may be applied, with advantage, to any member which has axial or longitudinal stress applied thereto, whether in the form of pressure, either continuous or intermittent, or in the form of percussive stresses, with or without longitudinal and/or rotary movement, some convenient practical arrangements each embodying the invention are shown diagrammatically and by way of example in the accompanying drawings, in which Figure 1 is a vertical section of a simple form of nail-driving device embodying the invention, Figures 2 and 3 are similar views of two modified constructions, Figure 4 shows, in bottom plan, a modified form of base or foot which may be employed, Figure 5 illustrates one arrangement according to the invention as applied to a pneumatic drill, Figures 6 and 7 are fragmentary vertical sections of modifications, Figure 8 illustrates in plan one form of floating washer which may be employed with a holding device for simultaneously driving three nails into a surface to be penetrated, and Figure 9 shows, partly in vertical section, one arrangement employing the invention for boring gun barrels.

In the construction shown in Figure 1, the supporting device comprises a tubular guide or barrel A of hardened steel open at one end $A^1$ which will hereinafter be referred to as the "upper end" though it will be readily appreciated that the device may be employed with the barrel A in any position. The lower end of the barrel A is closed by a transverse end wall $A^2$ having a central aperture $A^3$ whose diameter is slightly larger than the diameter of the nail B to be driven. Disposed within the barrel A is an axially floating transverse supporting plate or washer C, also of steel, which makes a close sliding fit in the barrel and is sufficiently thick to preclude lateral canting of the washer, with consequent risk of jamming, within the bore of the barrel A. The floating washer C has a central aperture $C^1$ which thus lies in axial alignment with, and is of substantially the same diameter as, the aperture $A^3$ in the fixed end wall $A^2$ of the barrel. This apertured end wall $A^2$ acts, not only as an additional lateral support for the nail B, as described below, but also as a stop against the inner surface of which bears the lower end of a conical helical compression spring $C^1$ whose upper end bears against the lower surface of the floating washer C. This spring $C^1$ is thus coaxial with the barrel A and, in order to prevent displacement of the spring $C^1$, its lower end is anchored to the transverse apertured end wall or stop as by an upset end portion of the spring detachably engaging an aperture $C^2$ or recess in the said end wall $A^2$. If desired, there may be a similar interengagement between the upper end of the spring and the floating washer C. Arranged above the floating washer C, and anchored thereto as above described, is a second conical helical compression spring $C^3$ which is thus also coaxial with the barrel A, the apertures $A^3$, $C^1$ in the fixed end wall or stop $A^2$ and in the floating washer C thus lying in alignment with the longitudinal axes of the compression springs $C^1$, $C^3$.

Disposed in the upper end or mouth of the barrel A is a driver in the form of a plunger D slidable within the barrel A, the lower or inner face of the plunger having a central recess $D^1$ which thus lies in alignment with the apertures $C^1$, $A^3$ in the floating washer C and end wall $A^2$. The upper or outer end of the plunger D which projects from the barrel A has an enlarged head $D^2$ with a flat surface at right angles to the longitudinal axis of the plunger. A releasable stud $D^3$ in screw-threaded engagement with the wall of the barrel A extends into a longitudinal recess or groove $D^4$ in the plunger D so that, when the stud $D^3$ is screwed home, unintentional withdrawal or ejection of the plunger D is prevented though axial movement of the plunger within the barrel A is permitted.

When in use, the shank of the headless nail B is inserted through the aperture $A^3$ in the end wall $A^2$ of the barrel A and thence through the aperture $C^1$ in the floating washer C until the upper end of the nail B lies in the central recess $D^1$ in the anvil D. The lower end of the nail B, or the point thereof when such point is provided, then lies in or projects a short distance below the aperture $A^3$ in the fixed end wall $A^2$ of the barrel A. By placing the base or foot $A^4$ of the barrel A against the surface E into which the nail B is to be driven, and applying hammer blows to the head $D^2$ of the plunger D the nail B will be driven through the said surface E into the substance to be penetrated. During this longitudinal movement of the nail B within the barrel A the length of the nail lying above the surface E being penetrated is laterally supported at three axially spaced points, namely at the said surface E by the fixed end wall $A^2$ of the barrel, at the upper end by engagement with the recess $D^1$ in the anvil D and at an intermediate point by the floating washer C. As penetration proceeds, the resistance to such penetration increases, but the degree of lateral support also increases automatically since, as the plunger D moves downwards in the barrel A, the springs $C^1$, $C^3$ are compressed and the floating washer C also moves downwards so that the axial spacings or "spans" between the points of lateral support will be progressively decreased. Initiation of bending or flexure of the nail B is thus prevented throughout its travel, that is to say until the length of the nail still projecting above the surface E penetrated is approximately equal to the sum of the thicknesses of the fixed end wall $A^2$, floating washer C and the fully compressed springs $C^1$, $C^3$, plus the axial depth of the recess $D^1$ in the plunger or anvil D. If the projecting length of the nail B is such as to render it undesirable to attempt to drive it further by use of the hammer direct, the screwthreaded stud $D^3$ is released and the plunger D withdrawn whereupon the floating washer C and springs $C^1$, $C^3$ are detached and the plunger D reinserted. The further penetration can now be effected with the nail B supported at two axially spaced points, namely at the end wall $A^2$ of the barrel A and in the recess $D^1$ of the plunger D. Should complete penetration be required the remainder of the nail can usually be driven in by application of the hammer direct, though it is preferred to provide a screwthread or other means at the upper end of the nail B for the application of a head thereto. Alternatively the projecting end of the nail may be clinched over to form a head.

When, as is often the case, it is desired that a predetermined length of the nail B shall remain projecting from the surface E penetrated, predetermination of this length to suit requirements may be provided for in various ways. According to one arrangement as shown in Figure 2, a plurality of floating washers F are provided in the barrel A and axially spaced apart by compression springs $F^1$ as above described. The number of washers F (and associated compression springs $F^1$) which are initially inserted in the barrel A will be dictated primarily by the length of the nail B to be driven, but the length of projection $x$ of the nail B from the surface E penetrated can be determined by the number of washers F remaining in the barrel A at the termination of the final driving operation by means of the supporting device. That is to say, washers F can be successively detached thus progressively reducing the length $x$ of the nail B which projects above the surface E until the requisite length is obtained. Whether one or several washers C or F is employed, however, a positive limiting stop may be provided between the driver and the barrel, the range of travel of the driver relatively to the stop being adjustable at will. To this end, as shown in Figure 2, an annular flange or collar $G^2$ on the plunger G may cooperate with the upper end of the barrel A, the collar $G^2$ being adjustable along the plunger G by means of a screwthread, with a suitable associated locking washer $G^3$. This adjustment will provide for relatively fine determination of the length $x$ of the nail B which projects from the surface E penetrated when the plunger G is at the inward limit of travel as determined by the position of the collar $G^2$. The angularly adjustable collar may have a micrometer scale associated therewith for facilitating fine adjustment. If, however, an even finer adjustment is necessary, instead of or in addition to that provided by the collar $G^2$ the effective axial depth of the recess $G^4$ in the driver may be adjustable by means of a grub screw $G^5$, the plunger G being made in two separable parts G, $G^1$ for affording ready access to the axial passage $G^6$ containing the grub screw $G^5$.

A further method of providing for adjustment of the length of nail projecting from the penetrated surface E is shown in Figure 3, that is to say by interposing one or more "idler" washers H, between the driver and the uppermost compression spring $H^2$ in the barrel A, each of the idler washers H having a central aperture $H^1$ whilst the washers H themselves may be of varying thicknesses. In this respect it will be understood that instead of the driver being in the form of a plunger part of which extends from the barrel A, the driver may be in the form of a head plate $H^3$ which lies wholly within the barrel A and to which hammer blows are imparted through a punch $H^4$ or the like inserted into the mouth $A^1$ of the barrel A.

In order to facilitate maintenance of the barrel with its longitudinal axis approximately normal to the surface to be penetrated, the barrel is furnished with the base or foot $A^4$ which conforms to the said surface. Instead, however, of forming the foot $A^4$ integral with the barrel, an end cap J including the apertured end wall $J^1$ of the barrel and in screwthreaded or other engagement with the lower end thereof may be provided whose lower flat surface (covered if desired with a layer of fabric or rubber $J^3$) bears flat against the surface E to be penetrated by the nail B. Alternatively, the lower end of the barrel, or the said end cap, may have a plurality of feet $J^3$ (Figure 4), say three in number, for bearing against the said surface E as a "three-point" support.

The device above described may be operated wholly manually, i. e. by the use of a hand hammer, or the barrel may form an extension of or attachment to the casing of a drill, pick, punch or the like. In this respect, it will be readily appreciated that the supporting device is not limited in its application to elongated members such as picks, punches and nails which are employed for penetration solely by the successive application of percussive stresses without at the same time applying either reciprocation or rotation or oscillation of the member about its longitudinal axis. For example, as shown in Figure 5, the supporting device according to the invention may be applied, as an accessory or guide-attachment $K^1$ to the shank $L^1$ of a rock drill L to which both percussive blows and rotary motion are applied simultaneously by the striker $L^2$ of the pneumatic tool acting on the driver M as the tool L advances telescopically within the attachment or guide $K^1$, the driver M having a helical groove or grooves $M^1$ engaged by a follower or followers $M^2$ carried by the casing $K^1$. A flange $L^3$ formed integral with the drill shank $L^1$ is then acted upon by the driver M after the drill $L^1$ has been inserted into the barrel or casing $K^1$. In other instances, for example steam driven reciprocating rock drills, to which combined reciprocating and rotary motion is applied to the drill, the arrangement will be similar except that the compression springs within the barrel will need to be somewhat more robust in order to withstand the fatigue attendant upon the larger amplitude of reciprocation.

Under some circumstances it may prove desirable to provide means permitting movement of the driver, or other part through which the compressive stress is applied to the member, in one direction only, that is to say means which will prevent, or reduce, recoil or rebound of the driver between successive applications of longitudinal stress to the member. For example, as shown in Figure 6, a friction stud or shoe N carried by the barrel A may be spring-pressed against the driver D or a part moving therewith, or, as shown in Figure 7, the said part or driver $H^3$ may be loaded by a spring $N^1$ which tends to compress the locating springs $H^2$ of the floating washer or washers. The loading spring $N^1$ will then be compressed, at the commencement of the compressive load on the member, by urging the barrel A towards the surface to be penetrated.

Whilst the supporting devices above described deal with only a single elongated member at a time, the device may be modified to deal with two or more members simultaneously, these members being relatively spaced as desired. To this end, the apertured end wall O of the barrel (and the apertured supporting washer, or each such washer) may have a plurality of apertures $O^1$ (Figure 8) spaced apart to correspond to the spacing required for a group of nails, such as the triangular spacing usually adopted for attaching brackets and the like to walls. The inner or lower face of the driver is then provided with similarly spaced recesses. With this arrangement it may be preferred to make the lower face of the driver or head plate plane, and to insert a separate driver having the required spaced apertures between the driver and the uppermost compression spring. If then the apertured end wall of the barrel is detachable, as by forming it as an integral part of the end cap J above described with reference to Figure 3, the one barrel can be employed for dealing with single elongated members or with a plurality of members at different spacings by inserting into the barrel the appropriately apertured head plate, washer or washers, and end wall or stop.

Whilst a supporting device according to the invention particularly lends itself for use with members employed for purposes of penetration, whether the longitudinal stress thereon is produced by percussion, reciprocation or pressure, the invention may be employed with advantage in the support of thrust rods, connecting rods and the like, lengthy reciprocating pump shafts and other similar members having an appreciable unsupported length subjected to a compressive load. Further, elongated members of various cross-section may be supported, the apertures in the end wall and washer or washers being shaped accordingly. For example, by making these apertures oblong a flat strip may be driven by the driver so as to cause the said strip to penetrate or shear a substance, such for example as hard wood. Though the internal cross-section of the barrel must necessarily correspond to the external shape of the driver and floating washers, this shape may vary as desired as also the external cross-sectional shape of the tubular guide or barrel.

A supporting device according to the invention may also be employed for boring gun barrels, for example as shown in Figure 9, the drill P being supported by the axially spaced supporting washers $Q^1$ whilst washers $R^1$ slide within the barrel Q of the device, the washers R¹ being axially spaced apart along the external surface of the work piece R to be bored.

It will be understood that the constructions described and indicated above are given by way of example only and that details may be modified to suit requirements. For example, whilst it is preferred to provide an apertured end wall on the barrel for affording a lateral support over the widest possible range permitted by the length of the barrel, the end wall or stop may be constituted by an apertured internal transverse wall of the barrel spaced from the lower extremity thereof.

What we claim as our invention and desire to secure by Letters Patent is:

1. A device for laterally supporting an elongated member while under longitudinal compressive stress, comprising a tubular guide, an apertured stop on said guide, at least one floating apertured supporting plate extending transversely across the interior of the tubular guide, a thrust member through which the longitudinal compressive stress is applied to the elongated member when extending through the apertures in the stop and lateral supporting plate, a compression spring which acts between one side of the supporting plate and the apertured stop, and a compression spring which acts between the other side of the supporting plate and the said thrust member.

2. A supporting device as claimed in claim 1, in which the thrust member through which the compressive stress is applied to the elongated member cooperates with means on the tubular guide for preventing unintentional withdrawal or ejection of the thrust member from the tubular guide.

3. A supporting device as claimed in claim 1, in which the thrust member through which the compressive stress is applied to the elongated member cooperates with means on the tubular guide for preventing return movement of the thrust member between successive applications of the said stress.

4. A supporting device as claimed in claim 1 in which the apertured stop in said guide forms part of a foot or base adapted to conform to and bear against a surface to be penetrated by the elongated member.

5. A device for laterally supporting an elongated member while under longitudinal compressive stress, comprising a tubular barrel, an apertured end wall constituting a stop, in the barrel, a plurality of apertured floating washers axially spaced apart within the barrel, a thrust member through which longitudinal compressive stress is applied to the elongated member when extending through the apertures in the floating washers and end wall or stop, and compression springs acting between adjacent washers and between the two end washers and the stop and thrust member.

6. A device for laterally supporting an elongated member while under longitudinal compressive stress, comprising a tubular guide, an apertured stop on said guide, at least one floating apertured supporting plate extending transversely across and detachable from the interior of the tubular guide, a thrust member through which the longitudinal compressive stress is applied to the elongated member extending through the apertures in the stop and lateral supporting plate, a compression spring within and detachable from the barrel and acting between one side of the supporting plate and the apertured stop, and a compression spring within and detachable from the barrel and acting between the other side of the supporting plate and the said thrust member.

7. A device for laterally supporting an elongated member while under longitudinal compressive stress, comprising a tubular guide, an apertured stop on said guide, at least one floating apertured supporting plate extending transversely across the interior of the tubular guide, a driver through which the longitudinal compressive stress is applied to the elongated member extending through the apertures in the stop and lateral supporting plate, a compression spring which acts between one side of the supporting plate and the apertured stop, and a compression spring which acts between the other side of the supporting plate and the said driver.

8. A supporting device as claimed in claim 7, in which the driver is provided with a recess which engages the adjacent end of the elongated member to which the compressive stress is to be applied.

9. A device for laterally supporting an elongated member while under longitudinal compressive stress, comprising a tubular barrel, an apertured end wall constituting a stop on the barrel, a plurality of apertured floating washers axially spaced apart within and detachable from the barrel, a driver through which longitudinal compressive stress is applied to the elongated member extending through the apertures in the floating washers and end wall or stop, and compression springs within and detachable from the barrel and acting between adjacent washers and between the two end washers and the stop and driver.

10. A supporting device as claimed in claim 9, in which the driver is provided with a recess which engages the adjacent end of the elongated member to which the compressive stress is to be applied.

11. A device for laterally supporting an elongated member while under longitudinal compressive stress, comprising a tubular guide, an apertured stop on said guide, at least one floating apertured supporting plate extending transversely across the interior of the tubular guide, a driver through which the longitudinal compressive stress is applied to the elongated member when extending through the apertures in the stop and lateral supporting plate, a compression spring which acts between a supporting plate and the apertured stop, a compression spring which acts between a supporting plate and the said driver, and a limiting stop engaged by the driver so as to limit the range of longitudinal movement of said driver within the tubular guide.

12. A supporting device for driving nails and the like, comprising a tubular metal barrel open at one end, an apertured end wall at the other end of said barrel, the aperture being in axial alignment with the barrel, at least one floating apertured supporting washer extending transversely across the interior of the tubular guide, the aperture in the washer being in alignment with the aperture in the end wall, a thrust member in the form of a plunger slidable into the open mouth of the barrel, a compression spring acting between the end wall and one face of the washer, a compression spring acting between the other face of the washer and the adjacent face of the plunger, said plunger having a recess in alignment with the apertures in the washers and end wall, a limiting stop carried by the barrel and extending inwards therefrom, said limiting stop engaging a keyway longitudinally formed in the plunger, and a foot or base formed on the barrel at that end thereof adjacent to the apertured end wall.

JAMES CHRISTOPHER FITZMAURICE.
WILLIAM FAWCETT SHELFORD BIDWELL.

REFERENCES CITED

The following references are of record in the file of this patent:

UNITED STATES PATENTS

| Number | Name | Date |
|---|---|---|
| 1,699,519 | Brown | Jan. 22, 1929 |
| 2,280,469 | Brescka | Apr. 21, 1942 |